(12) United States Patent
Brodsky et al.

(10) Patent No.: US 7,541,065 B2
(45) Date of Patent: Jun. 2, 2009

(54) METHOD OF FORMING FILM STACK HAVING UNDER LAYER FOR PREVENTING PINHOLE DEFECTS

(75) Inventors: Colin J. Brodsky, Salt Point, NY (US); Wai-Kin Li, Poughkeepsie, NY (US); Steven A. Scheer, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/820,302

(22) Filed: Jun. 18, 2007

(65) Prior Publication Data
US 2007/0243333 A1    Oct. 18, 2007

Related U.S. Application Data

(62) Division of application No. 10/880,818, filed on Jun. 30, 2004, now Pat. No. 7,267,863.

(51) Int. Cl.
*B05D 7/00*    (2006.01)

(52) U.S. Cl. .................................. 427/402; 427/255.15
(58) Field of Classification Search .................. 428/422, 428/411.1; 427/255.15, 255.6, 255.7, 402
See application file for complete search history.

(56) References Cited

OTHER PUBLICATIONS

Li et al, Inhibition of thin polystyrene film dewetting via phase separation, Polymer 44 (2003), p. 5833-5841, Available online Jul. 18, 2003.*

* cited by examiner

*Primary Examiner*—Timothy H Meeks
*Assistant Examiner*—Elizabeth Burkhart
(74) *Attorney, Agent, or Firm*—Todd M. C. Li; Daryl Neff

(57) ABSTRACT

A method is provided for forming a film stack in which a first film including a first polymer is formed on a substrate. A second film, which can include a second polymer other than the first polymer, is formed to have an inner surface disposed on the first film. The second film can have a thickness at which a free energy of the second film would be negative if the second film were disposed directly on the substrate. Desirably, the resulting second film is substantially free of dewetting defects.

2 Claims, 4 Drawing Sheets

FIG. 4
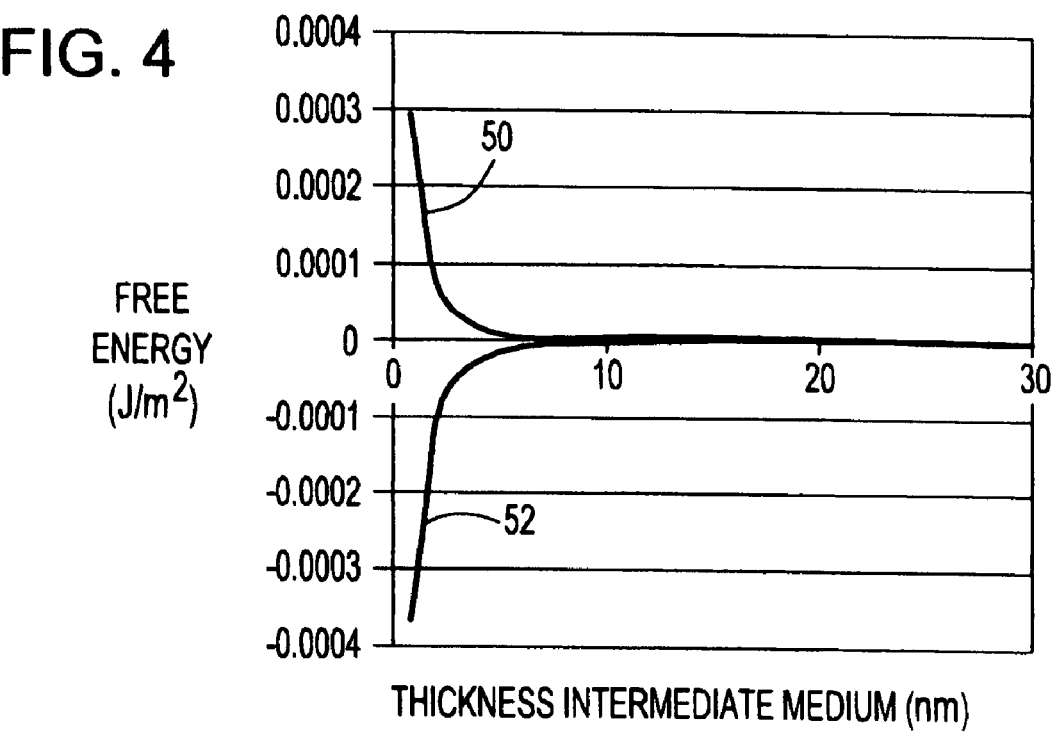
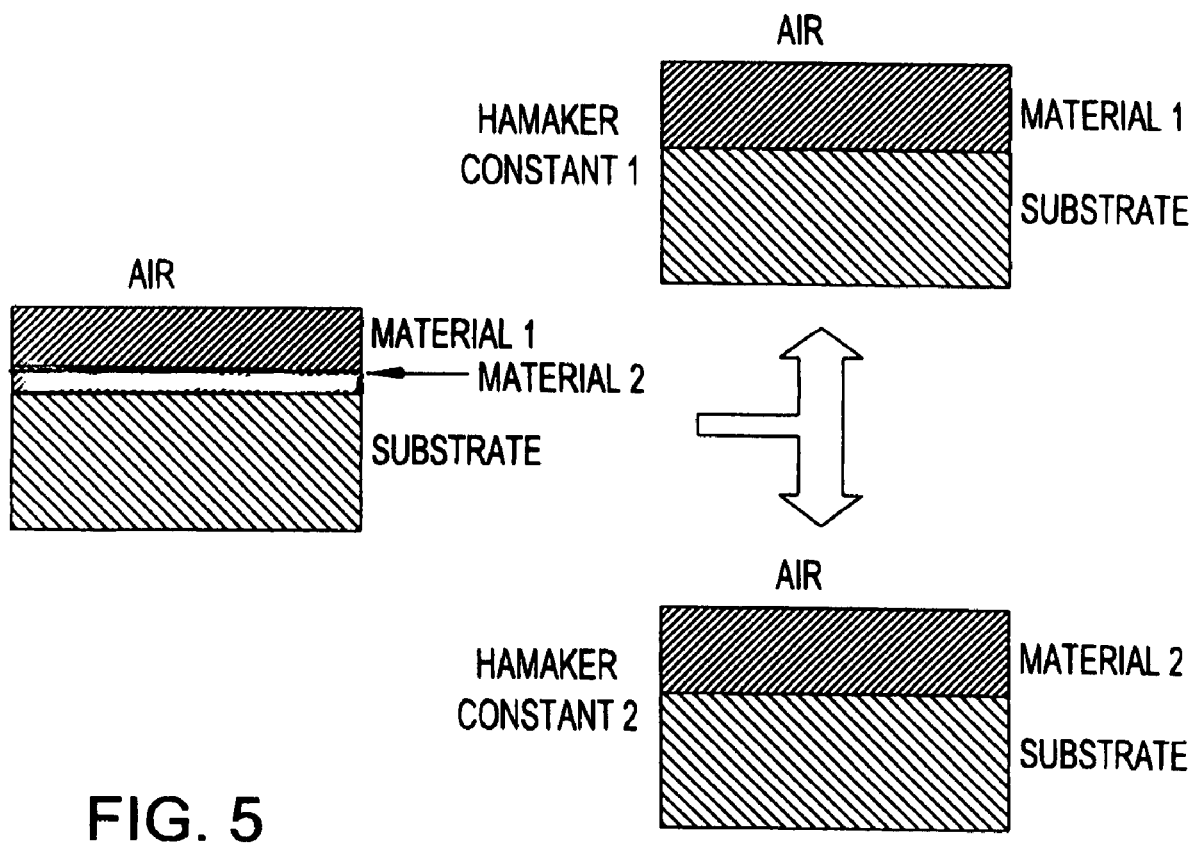
FIG. 5

METHOD OF FORMING FILM STACK HAVING UNDER LAYER FOR PREVENTING PINHOLE DEFECTS

CROSS-REFERENCE TO RELATED APPLICATION

The present application is a division of U.S. application Ser. No. 10/880,818 filed Jun. 30, 2004, now U.S. Pat. No. 7,267,863, the disclosure of which is incorporated herein by reference.

BACKGROUND OF THE INVENTION

The present invention relates to the processing of thin films, such as those used in the processing of very small structures including microelectronic devices.

As the size of microelectronic devices is reduced from one generation to the next, the demands placed on photolithography become ever greater. One consequence of the increased demands is the need to reduce the thickness of polymer films used as anti-reflective coatings (ARCs) and photoresist imaging layers. The demands are especially severe for certain types of applications such as first minima ARCs, thin imaging layers for bi-layer and tri-layer lithography schemes, and thin imaging layers used in photomask production.

One of the major problems associated with the use of thin polymer films for these applications has been the appearance of dewetting defects including "pinhole" defects. Dewetting defects usually occur due to long-range van der Waals forces. Due to Van der Waals forces, localized thinning of a polymer film on a substrate occurs when the polymer film has insufficient thickness to overcome a tendency to dewet from the substrate. An example of this phenomenon is illustrated in FIG. 1 for a bottom anti-reflective coating (BARC) layer disposed on a substrate of silicon dioxide. FIG. 1 illustrates a free energy curve 10 for a BARC layer disposed on a substrate of silicon dioxide, and a second curve 12 being the second derivative of the free energy curve 10. The BARC layer becomes unstable and has a tendency to dewet catastrophically at a thickness (50 nm) below which the free energy curve 10 turns sharply lower and heads negative. Such catastrophic dewetting is referred to as spinodal dewetting. The location of the zero in the second curve 12 illustrating the second derivative of free energy indicates a crossover point at about 85 nm between a film that dewets spinodally below that thickness and dewets via nucleation and growth of holes above that thickness. As further shown in FIG. 1, as the overall film thickness is increased, the free energy of the film passes through a maximum and starts to decrease slowly as the film thickness continues to be increased. In the thickness regime just beyond the thickness at which the film spinodally dewets, the film is metastable and can dewet via nucleation and growth of holes. If the film thickness at some localized point in the film falls below the 85 nm thickness of the crossover point, the film becomes locally unstable and dewets spinodally. A BARC film having a thickness of less than or equal to 80 nm, which is less than the crossover point thickness of 85 nm, is highly unstable, and dewets spinodally, rapidly dewetting to droplets. On the other hand, a BARC film having a thickness of 110 nm, does not dewet spinodally, but dewets locally via nucleation and growth of holes. However, a BARC film having a thickness of 200 nm, is so far from the crossover point on the free energy diagram that random local fluctuations in film thickness no longer result in local instability of the film.

Heretofore, there has been no known solution to this problem other than to increase the thickness of the film that is prone to dewet. Unfortunately, increase the thickness is not permitted, because advanced lithography processes call for reductions rather than increases in film thicknesses, for the following reasons. A thickened BARC film unnecessarily increases the difficulty of etching through the BARC film. A thickened photoresist imaging layer also increases risk of line pattern collapse, as well as reduces the process window.

Currently, it is common to utilize surface treatments such as an hexamethyldisilazane (HMDS) prime, prior to forming a coating such as an ARC or a photoresist. Such treatment promotes adhesion by changing the surface tension, and can also affect wettability of the coating by changing the spreading coefficient. However, even when a coating has a positive spreading coefficient, pinholes can still form when instability is present due to long range van der Waals forces.

SUMMARY OF THE INVENTION

According to an aspect of the invention, a film stack and method of forming a film stack are provided in which a first film is disposed on a substrate and a second film has an inner surface disposed on the first film. The second film has a thickness smaller than a reference thickness at which the second film would begin to dewet from the substrate if the second film were disposed directly on the substrate. However, the second film is substantially free of dewetting defects because it is disposed overlying the first film which has a first Hamaker constant having a negative value with respect to the substrate.

According to another aspect of the invention, a film stack is provided having a first film disposed on a substrate, and a second film disposed on the first film, wherein the second film has a thickness at which it would begin to dewet from the substrate if the second film were disposed directly on the substrate, but which is substantially free of dewetting defects because of the presence of the first film.

According to another aspect of the invention, a method of forming a film stack is provided which includes forming a first film on a substrate, and forming a second film having an inner surface disposed on the first film, the second film having a thickness at which a free energy of the second film would be negative if the second film were disposed directly on the substrate. However, the second film is substantially free of dewetting defects because of the characteristics of the first film.

BRIEF DESCRIPTION OF THE DRAWINGS

FIG. 4 is a graph illustrating free energy as a function of film thickness for different materials having positive and negative Hamaker constants, respectively.

FIG. 5 is a diagram illustrating a determination of free energy for a film stack having an intermediate film and an overlayer film.

DETAILED DESCRIPTION

Figure 2:
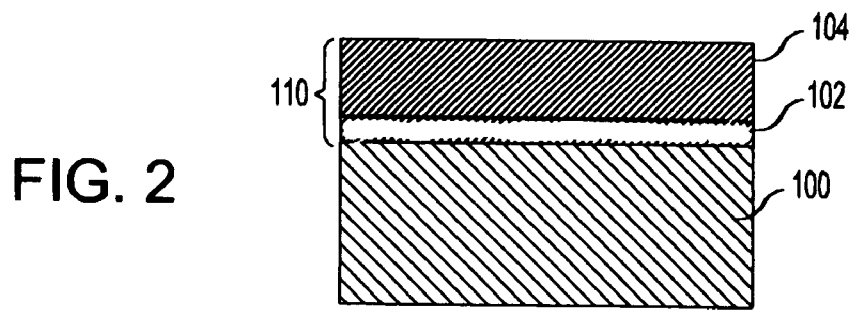
FIG. 2 is a diagram illustrating a film stack including an intermediate film disposed on a substrate and a top film disposed over the intermediate film.

An embodiment of a film stack according to an embodiment of the invention is illustrated in FIG. 2. According to such embodiment, a film stack 110 includes a first film 102 disposed on a substrate 100, and an anti-reflective coating (ARC), disposed as a second film 104 over the first film 102. The ARC is an example of one of many types of films improved by the present invention, such types including thin film polymers, atomic layer deposited (ALD) films, metalorganic chemical vapor deposition (MOCVD) deposited films, chemical vapor deposition (CVD) deposited films, and physical vapor deposition (PVD) deposited films. The film stack 110 is disposed within a medium which overlies the outer surface of the second film. The medium may be a fluid medium, i.e., a gaseous or liquid medium, for example, air or water, that contacts outer surface of the film stack. Alternatively, the medium may be a solid medium which is subject to a phase change to a fluid medium at a temperature of interest.

At the particular thickness to which it is deposited, the second film (ARC) ordinarily has a tendency to dewet from the substrate, due to long range attractive force between the substrate and medium. In the case of the solid medium, the second film has a tendency to dewet from the substrate when at least a part of the solid medium changes to a fluid phase. However, the presence of the first film 102 between the substrate 100 and the second film 104 modifies the long-range attractive force, such that the second film becomes a stable film at that thickness, and is no longer prone to nucleation and growth of holes.

Figure 1:
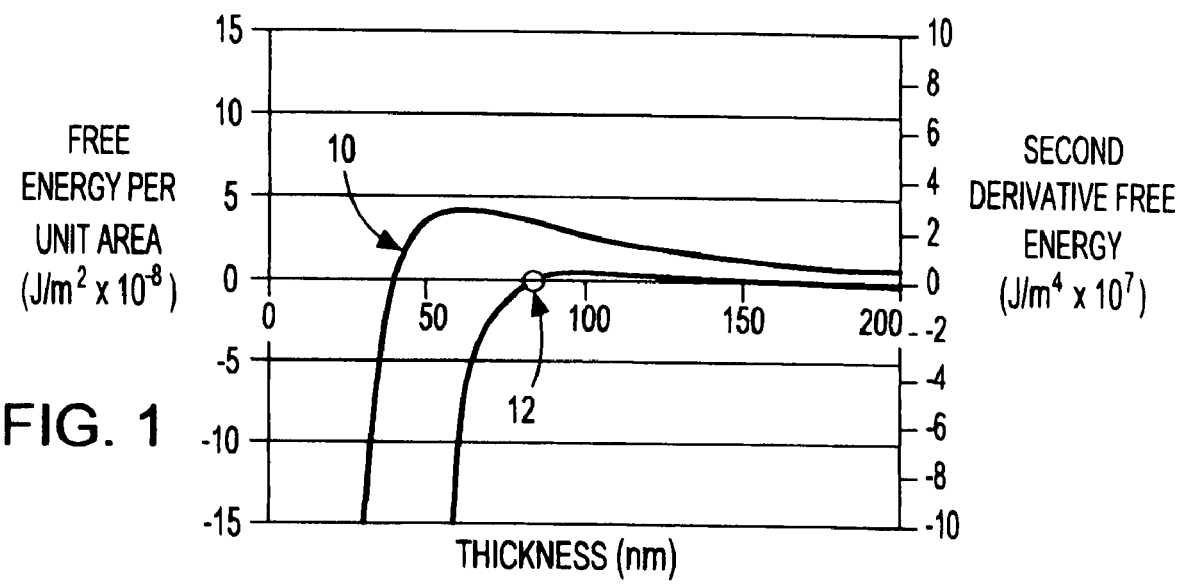
FIG. 1 is a graph illustrating free energy and a second derivative thereof for an anti-reflective coating (ARC) as a function of thickness of the film on a substrate.
Figure 3:
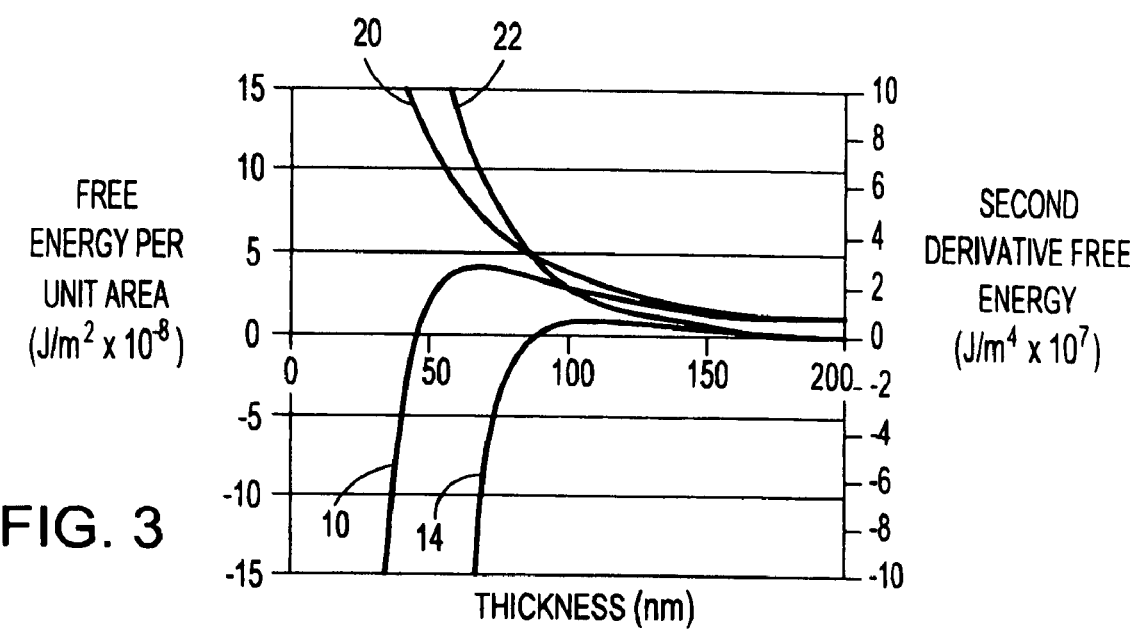
FIG. 3 is a graph illustrating free energy and a second derivative thereof for an anti-reflective coating (ARC) film as a function of thickness of the film on a substrate, for cases with, and without an intermediate stabilizing film.

FIG. 3 graphically illustrates a curve representing the free energy 10 and the second derivative thereof 14 for a first arrangement as described above relative to FIG. 1, in which the second film (e.g., ARC) is disposed directly on a substrate. The free energy of an arrangement including any two materials separated by a film of thickness h is given by the equation $$\phi_{vdW}(h) = -\frac{A}{12\pi h^2} \qquad \text{Equation (1)}$$

where $\phi_{vdW}$ is the free energy due to van der Waals forces, and A is referred to as the Hamaker constant. FIG. 4 graphs a curve 50 representing $\phi_{vdW}$ for different thicknesses in which the film has a negative value Hamaker constant A with respect to the substrate, and a curve 52 representing $\phi_{vdW}$ for different thicknesses in which the film has a positive value Hamaker constant A with respect to the substrate. As apparent from FIG. 4, equation (1) shows that for any material having a positive Hamaker constant, any decrease in the thickness of the film decreases the free energy of the film stack. The reduction in free energy results in the film becoming unstable and dewetting the substrate below a minimum thickness to minimize the overall free energy of the system. On the other hand, when the Hamaker constant is negative, it is apparent from curve 50 that decreasing the thickness of the film actually increases the free energy. Thus, the film stack remains stable.

The second derivative of the free energy according to Equation (1), is determined by $$\phi_{vdW}''(h) = -\frac{A}{2\pi h^4}. \qquad \text{Equation (2)}$$

The zero in this curve determines the minimum thickness below which the deposited film is subject to spinodally dewetting from the substrate. As graphed in FIG. 3, this minimum thickness occurs at 85 nm.

Referring again to FIG. 3, the free energy curve 20 and the second derivative thereof 22 are shown for a film stack including a second film, illustratively ARC, disposed over an intermediate film, which, in turn, contacts the substrate. The intermediate film modifies the long-range attractive force between the substrate and the medium, which is, illustratively, air. In the particular example shown, the intermediate film has a thickness of 4 nm. As shown in FIG. 3, the presence of the 4 nm intermediate film causes the slope of the free energy curve 20 in the second film stack to be dramatically different from that of the first film stack. In the second film stack, the second film (ARC) is now stable at all thicknesses, and shows no tendency to form "pinhole" defects due to dewetting.

An arrangement in which a two-layered film stack is disposed between a substrate and an overlying medium, e.g., air, has free energy, which is determined by the equation $$\phi_{vdW}(h) = -\frac{A_2}{12\pi h^2} + \frac{A_2 - A_1}{12\pi(h+d)^2} \qquad \text{Equation (3)}$$

where $A_1$ is the Hamaker constant of the overlying film having an outer surface contacted by the medium, h is the thickness of the overlying film, $A_2$ is the Hamaker constant of the under layer film which contacts the substrate, and d is its thickness. Referring to FIG. 5, the Hamaker constants are determined individually for each component film of the film stack, as if such component film were the only film disposed between the substrate and the overlying medium. The Hamaker constant $A_1$ is a measure of the van der Waals component force determined for the overlying film with respect to the substrate, according to the equation $$A_1 = A_x = \frac{3kT}{4}\left(\frac{\varepsilon_1 - \varepsilon_x}{\varepsilon_1 + \varepsilon_x}\right)\left(\frac{\varepsilon_2 - \varepsilon_x}{\varepsilon_2 + \varepsilon_x}\right) + \qquad \text{Equation (4)}$$
$$\frac{3h\nu_e}{8\sqrt{2}} \frac{(n_1^2 - n_x^2)(n_2^2 - n_x^2)}{(n_1^2 + n_x^2)^{\frac{1}{2}}(n_2^2 + n_x^2)^{\frac{1}{2}}\left\{(n_1^2 + n_x^2)^{\frac{1}{2}} + (n_2^2 + n_x^2)^{\frac{1}{2}}\right\}}$$

where $\in_1$ is the permittivity of the medium $\in_2$ is the permittivity of the substrate, and $\in_x$ the permittivity of said first film, and $n_1$, $n_2$, and $n_x$ are the indices of refraction of the medium, the substrate, and said first film, respectively, k is the Boltzmann constant, T is temperature, h is Planck's constant and $v_e$ is the main electronic absorption frequency (usually $3.0\times10^{15}s^{-1}$). The Hamaker constant $A_2$ is a measure of the van der Waals component force determined for the under layer film with respect to the substrate, according to the equation $$A_2 = A_y = \frac{3kT}{4}\left(\frac{\varepsilon_1-\varepsilon_y}{\varepsilon_1+\varepsilon_y}\right)\left(\frac{\varepsilon_2-\varepsilon_y}{\varepsilon_2+\varepsilon_y}\right) + \frac{3h\nu_e}{8\sqrt{2}} \frac{(n_1^2-n_y^2)(n_2^2-n_y^2)}{(n_1^2+n_y^2)^{\frac{1}{2}}(n_2^2+n_y^2)^{\frac{1}{2}}\left\{(n_1^2+n_y^2)^{\frac{1}{2}}+(n_2^2+n_y^2)^{\frac{1}{2}}\right\}}$$

where $\varepsilon_1$ is the permittivity of the medium, $\varepsilon_2$ the permittivity of the substrate, and $\varepsilon_y$ the permittivity of said second thin film, and $n_1$, $n_2$, and $n_y$ are the indices of refraction of the medium, the substrate, and said second film, respectively. In the above equations, the permittivities of the substrate, film and medium (air) can be replaced by the dielectric constants $k_i = \varepsilon_i/\varepsilon_0$ for each, since the permittivities are appear only in unitless factors.

Figure 6:
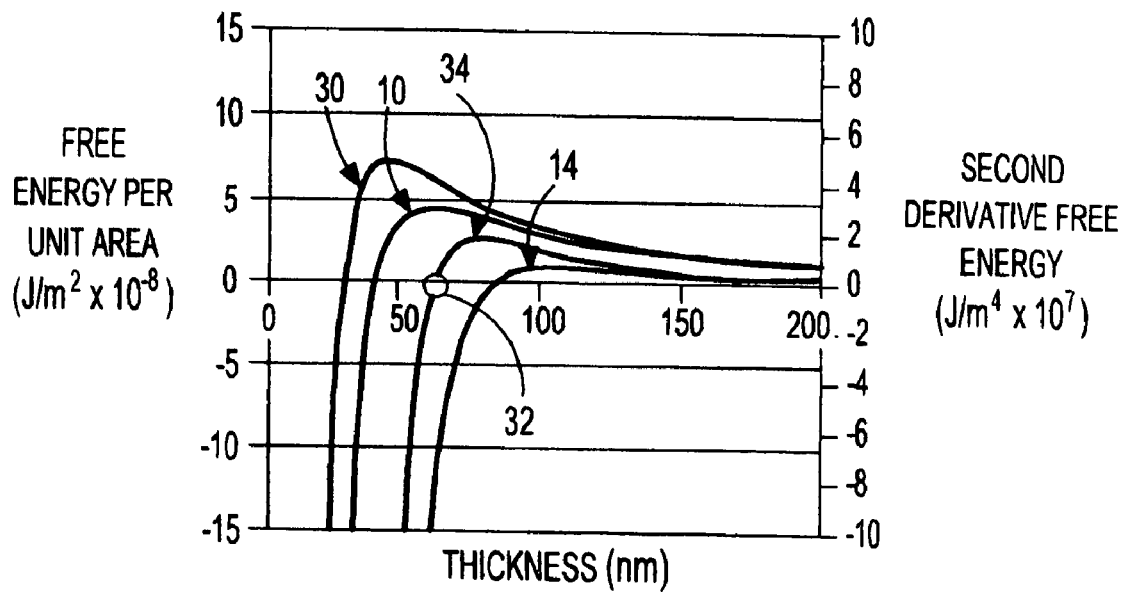
FIG. 6 is a graph illustrating free energy and a second derivative thereof for an anti-reflective coating (ARC) film as a function of thickness of the film for cases with a small thickness intermediate film and without.

The amount of stabilization achieved for a given film stack according to the method described herein is related to the thickness and dielectric properties of the intermediate film. The result of reducing the thickness of the intermediate film from 4 nm to 2 nm is illustrated in FIG. 6. In such case, the film stack including the 2 nm intermediate film is not stable for all thicknesses of the second film (ARC). However, the free energy curve 30 and the second derivative 34 thereof are shifted to the left of their original positions 10 and 14, and now show stability at a smaller thickness than before. The presence of the zero 32 in the second derivative curve 34 for the second film stack now indicates the second film (ARC) to have a minimum thickness of 60 nm to avoid spinodal dewetting, as compared to the original minimum thickness of 85 nm for the film stack having no intermediate film.

Figure 7:
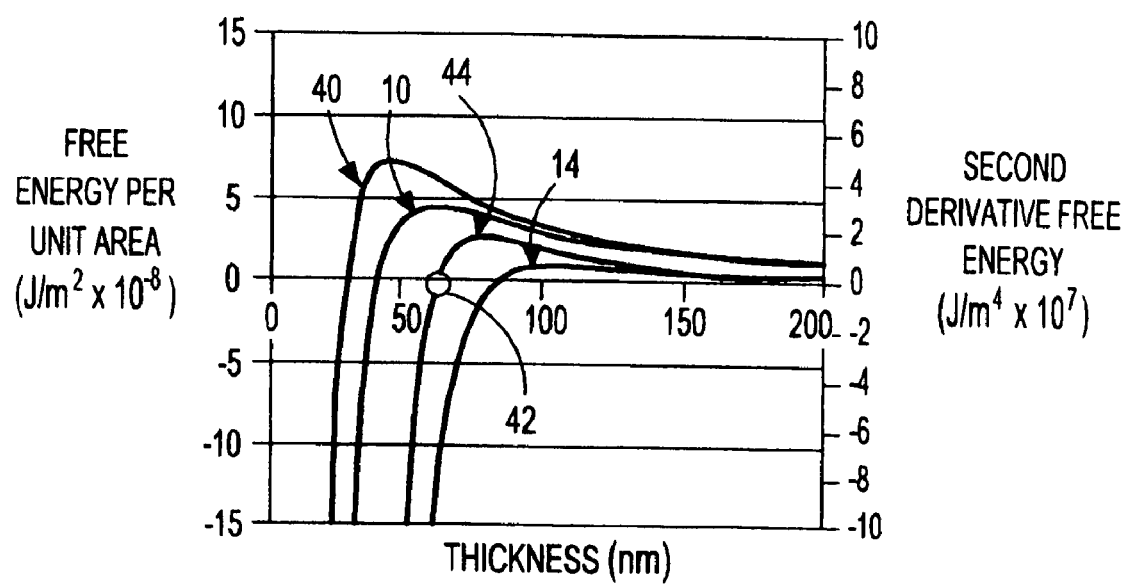
FIG. 7 is a graph illustrating free energy and a second derivative thereof for an anti-reflective coating (ARC) film as a function of thickness of the film for cases with an intermediate film having a lower value Hamaker constant and without.

FIG. 7 illustrates another example of a film stack in which the thickness of the intermediate film is maintained constant at 4 nm, but in which the dielectric properties of the intermediate film do not as strongly affect the long-range attractive force between the substrate and the air. Accordingly, the free energy curve 40 and the second derivative 44 thereof are shifted to the left by about the amount as they are for the film stack having the 2 nm intermediate film, as graphed above in FIG. 6. In this case, the film stack is subject to spinodal dewetting at a thickness below 59 nm, as determined by the location of the zero 42 in the second derivative curve 44.

Figure 8:
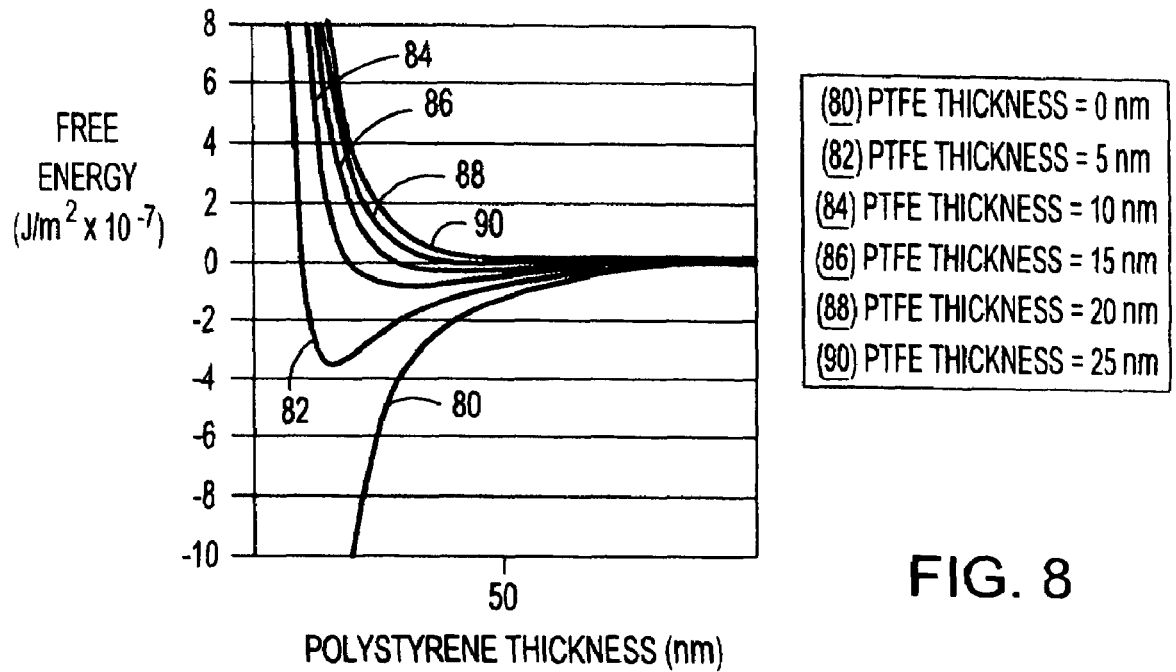
FIG. 8 is a graph illustrating free energy for a film stack having an overlayer of polystyrene for different thicknesses of intermediate films.

An exemplary film stack according to an embodiment of the invention will now be described, with respect to FIGS. 8 and 9. FIG. 8 is a graph depicting free energy curves for a film stack in which a top film of polystyrene is disposed on an intermediate film of polytetraflouroethylene (PTFE), which in turn, is disposed on a substrate of silicon dioxide. The properties of these materials are:

$n_{SiOx}=1.46$ $n_{Polystyrene}=1.557$ $n_{PTFE}=1.359$ $\varepsilon_{SiOx}/\varepsilon_0=3.9$ $\varepsilon_{Polystyrene}/\varepsilon_0=2.55$ $\varepsilon_{PTFE}/\varepsilon_0=2.1$ From these constants, the Hamaker constant is calculated for each of the polystyrene and PTFE materials individually, with respect to an arrangement including the substrate, only one of the polystyrene and PTFE materials and the overlying medium (air) which contacts the outer surface of the film stack. The results of these calculations are:

$A_{Polystyrene}=1.358\times10^{-20}$ J, and $A_{PTFE}=-1.070\times10^{-20}$ J.

Because of the positive value of its Hamaker constant, it is clear that polystyrene would be unstable for small thicknesses, if disposed directly on the silicon dioxide substrate. On the other hand, the negative value of the Hamaker constant for the PTFE film indicates that it would be stable at all thicknesses. Equation (3) above can be used to demonstrate that the intermediate film of PTFE disposed between a polystyrene film and a silicon dioxide substrate stabilizes the polystyrene film. A graph illustrating the free energy of the film stack, for different thicknesses of the PTFE intermediate film, is provided in FIG. 8. As shown therein, when the film stack lacks the PTFE intermediate film, the free energy curve 80 is negative for all thicknesses. Free energy is negative for small thicknesses of the polystyrene film when the PTFE film has thickness of 5 nm (curve 82). On the other hand, curves 84, 86, 88, and 90 indicate that the free energy remains positive for film stacks having polystyrene films of small thickness, when the PTFE film has thicknesses of 10 nm, 15 nm, 20 nm, and 25 nm, respectively.

However, determining the thicknesses of the polystyrene and PTFE films which correspond to a stable film stack can be difficult by determining the free energy according to Equation (3). The film thicknesses at which the film stack transitions between stability and instability are more readily determined from the following equation which is the second derivative of Equation (3)

$$\phi''_{vdW}(h) = -\frac{A_2}{2\pi h^4} + \frac{A_2-A_1}{2\pi(h+d)^4} \qquad \text{Equation (5)}$$

As indicated in the foregoing, when $\phi''_{vdW}(h)$, the second derivative of the free energy equation, is positive, then the film stack is stable. However, when $\phi''_{vdW}(h)$ is negative, the film stack is unstable. These transitions are apparent from an examination of FIG. 9 and Table 1.

TABLE 1

| PTFE Thickness (nm) | Polystyrene Film Stable Below Thickness (nm) |
|---|---|
| 0 | All Unstable |
| 5 | 20 |
| 10 | 42 |
| 15 | 64 |
| 20 | 86 |
| 25 | >100 nm |

Figure 9:
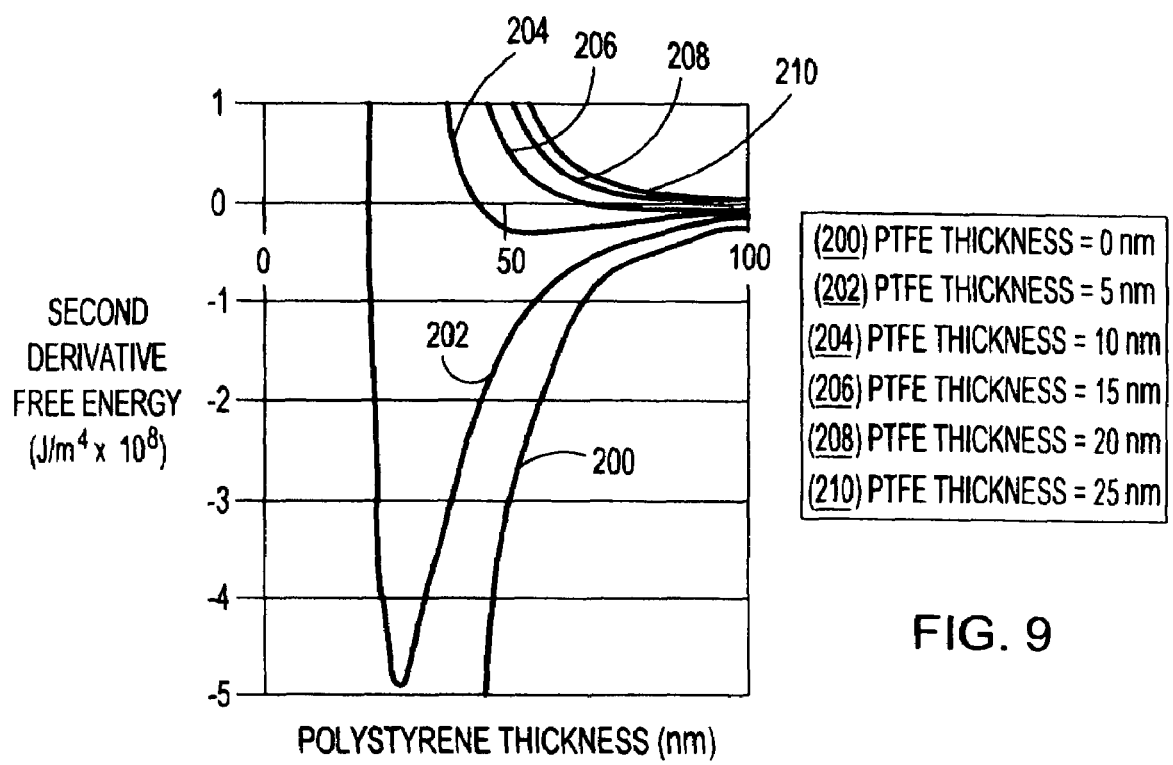
FIG. 9 is a graph illustrating a second derivative of free energy for a film stack having an overlayer of polystyrene for different thicknesses of intermediate films.

As indicated by curve 200 in FIG. 9 and the first entry of Table 1, when there is no PTFE film, the film stack is unstable for all thicknesses of the polystyrene film. However, as indicated by curve 202 and the second entry of Table 1, when the PTFE film has a thickness of 5 nm, the polystyrene film is stable for only for a thickness of less than 20 nm. As the thickness of the PTFE is increased to 10 nm (curve 204) and more, the polystyrene film becomes stable for thicknesses of the polystyrene film greater than 20 nm. For example, when the thickness of the PTFE film is 15 nm thick (curve 206), the polystyrene film is stable for all thicknesses less than 64 nm. When the PTFE film is 20 nm thick (curve 208), the polystyrene film is stable at an even greater thickness. At a PTFE film thickness greater than 25 nm (curve 210), the polystyrene film is stable for thicknesses from zero to beyond 100 nm.

The exemplary film stack including polystyrene and PTFE, as described in the foregoing, is only one example. According to the principles of embodiments of the invention described herein, any film that is subject to dewetting from a substrate can be stabilized by the addition of an appropriate stabilizing film. The Optical and dielectric properties of the stabilizing film, as well as its thickness, are factors in determining the value and magnitude of the stabilization achieved by the film, as represented by the Hamaker constant.

While the invention has been described in accordance with certain preferred embodiments thereof, those skilled in the art will understand the many modifications and enhancements which can be made thereto without departing from the true scope and spirit of the invention, which is limited only by the claims appended below.

What is claimed is:

1. A method of forming a film stack, comprising:

forming a first film including a first polymer on a substrate; and forming a second film including a second polymer other than said first polymer, said second film having an inner surface disposed on said first film, said second film having a thickness at which a free energy of said second film would be negative if said second film were disposed directly on the substrate, said second film being free of dewetting defects, wherein said second film consists essentially of a material having a dielectric constant k higher than about four times the dielectric constant of free space.

2. A method of forming a film stack, comprising:

forming a first film including a first polymer on a substrate; and forming a second film including a second polymer other than said first polymer, said second film having an inner surface disposed on said first film, said second film having a thickness at which a free energy of said second film would be negative if said second film were disposed directly on the substrate, said second film being free of dewetting defects, wherein the substrate includes silicon dioxide, said first film consists essentially of polytetraflouroethylene (PTFE), and said second film consists essentially of polystyrene.

* * * * *